Oct. 4, 1966 KAZUO ISHIKAWA ET AL 3,276,199
AUTOMATICALLY SPRING WOUND CLOCK

Filed April 22, 1964 4 Sheets-Sheet 1

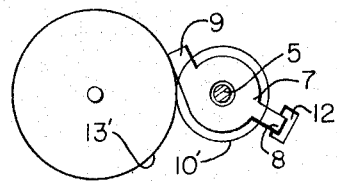
Fig. 5
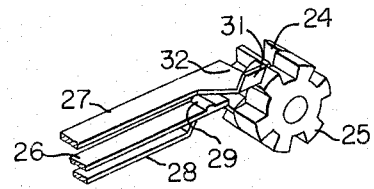
Fig. 6(A)
Fig. 6(B)
(a) 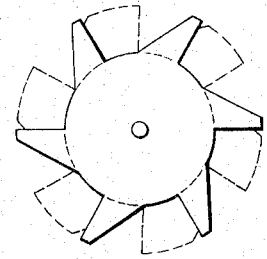   (b) 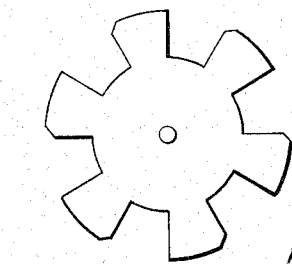
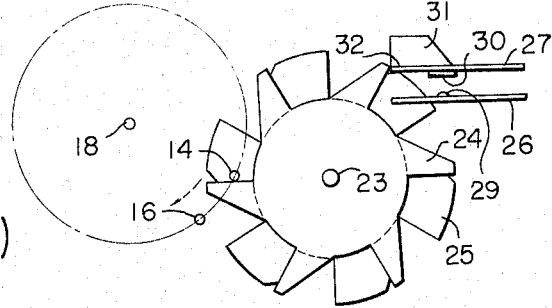
Fig. 7(A)
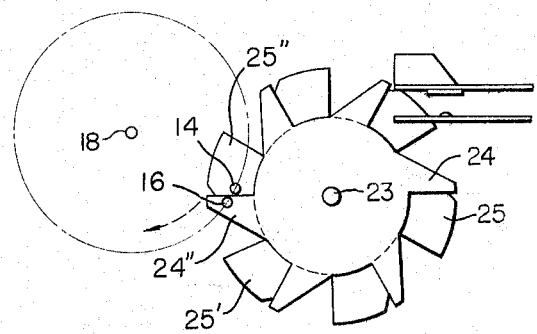
Fig. 7(B)

Oct. 4, 1966  KAZUO ISHIKAWA ET AL  3,276,199
AUTOMATICALLY SPRING WOUND CLOCK
Filed April 22, 1964  4 Sheets-Sheet 3

United States Patent Office 3,276,199
Patented Oct. 4, 1966

3,276,199
AUTOMATICALLY SPRING WOUND CLOCK
Kazuo Ishikawa, Kohoku-ku, Yokohama, and Toshio Umezawa, Sagamibara, Japan, assignors to Jeco Company, Limited, Tokyo, Japan, a corporation of Japan
Filed Apr. 22, 1964, Ser. No. 361,798
4 Claims. (Cl. 58—41)

This invention relates to automatically spring wound clocks wherein a contact mechanism is operated by a double-cam.

There have already been suggested various clocks operated by the torque of a spring wound by the periodical operation of an electric motor. However, since the motor is periodically connected and disconnected through a switch contact operating by the unwinding of the spring, the contact mechanism has various defects and complicated mechanisms have been required to eliminate such defects.

A principal object of the present invention is to provide an automatically spring wound clock wherein, as the range of only one wind of a main spring is used, the time keeping mechanism is operated by a substantially constant torque so that the accuracy is very high.

Another object of the present invention is to provide an automatically spring wound clock having a contact mechanism which will make a stable positive contact over extended periods of operation.

According to the present invention, a cam is rotated through a driven lever by a main spring, the cam controlling contact springs to feed an electric current to a motor and to rotate the motor. When the cam is further rotated through another driving lever by the rotation of the motor, the contact springs interrupt the current to stop the motor.

In a contact mechanism for automatically spring wound clocks in which a time keeping mechanism is operated by the torque of a spring wound by the periodical operation of an electric motor, the present invention is characterized in that a double cam is operated through a driven lever rotated by an electric motor and a driving lever rotated by a main spring so that contacts may be quickly opened and closed by the cam. The two driven levers allow gears to rotate by some angles to increase the positivity of the operation on the cam, and in case the torque of the motor becomes too weak to wind the spring, the two driven levers may stop in contact with the cam before the main spring is unwound completely. Thus the spring cannot be unwound beyond a fixed range, and when the cam does not rotate, the forward end part of an upper contact spring drops into a recess on the cam surface so as to prevent the movement of the cam and stop the free rotation of the cam a projection on the contact spring may prevent it from reversing the cam when it drops from the tooth of the cam, and when the cam is pushed by the driven lever rotated by the main spring of a torque weaker than of the motor, the forward end part of the upper contact spring will run on the flat surface of the cam of a low load. When both upper and lower contact springs are ascended the steep slope of the cam or the load is large, the cam will be pushed by the driven lever rotated by the motor having a sufficient torque.

Consequently, the contacts can be opened and closed positively and the operation can be made stable and accurate over a long time. Further, as soon as the battery is replaced with a new one, the original stage can be restored.

A preferred embodiment of the invention shall be described more in detail with reference to the drawings in which:

FIGURE 5 shows an embodiment of the reversal preventing mechanism wherein such friction contact rotors as pulleys are used for the transmitting system;

FIGURE 6(A) is a magnified partial perspective view of contact springs and a double-cam to operate them as arranged;

FIGURE 6(B) shows side views of the profiles of the teeth of the component cams of the double-cam;

FIGURES 7 to 13 are side views showing the relative positions of the contact springs, double-cam and two driven levers in operation;

Figure 1:
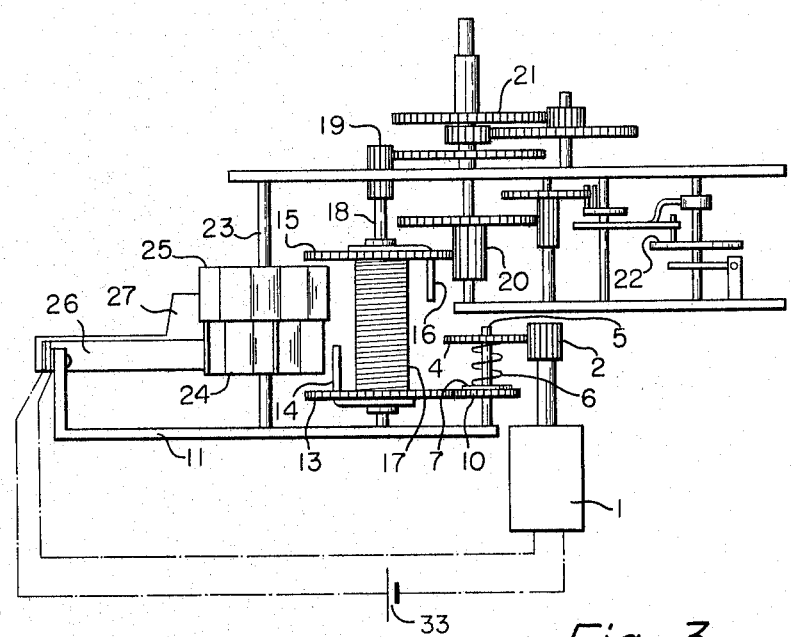
FIGURE 1 is a general plan view of the mechanism of an automatically spring wound clock embodying the present invention.
Figure 2:
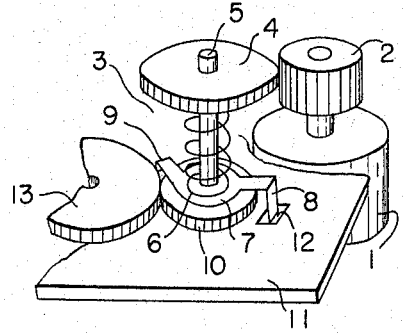
FIGURE 2 is a perspective view of the part of a reversal preventing mechanism in a transmitting gear mechanism transmitting the rotation of an electric motor.

In the drawings, 1 is an electric motor, 2 is a pinion attached to the motor shaft and 3 is a reversal preventing mechanism. 4 is a gear meshed with the pinion 2 and fixed to a shaft 5. 6 is a spring loosely fitted on the shaft 5. 7 is a reversal preventing plate also loosely fitted on shaft 5. 8 is a stopping member made by bending a part of one end of the reversal preventing plate 7. 9 is a locking member made by bending a part of the other end of the reversal preventing plate. 10 is a gear fixed to the shaft 5 and meshed with a first gear 13. 11 is a ground plate. 12 is a stopping slot in which the stopping member 8 of said reversal preventing plate 7 is located.

Figure 14:
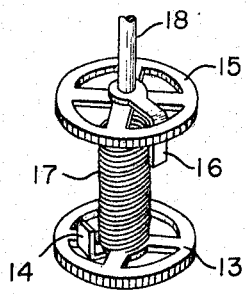
FIGURE 14 is a perspective view of gears fitted with the driven levers.

14 is a motor driven lever rotated through the first gear 13. Both gear 13 and lever 14 are loosely fitted on a shaft 18 so as to be free to rotate relative to each other. 15 is a second gear fixed to the shaft 18. 16 is a main spring-driven lever rotated via the second gear 15 and loosely fitted on the shaft 18. 17 is a main spring connected at respective ends with the first gear 13 and the second gear 15. As shown in FIGURE 14, the motor-driven lever 14 and the main spring-driven lever 16 are made freely rotatable by some angular ranges (for example by about 90 degrees in the drawing) with respect to the gears 13 and 15, respectively. 19 is a pinion secured to the shaft 18 for the purpose of operating a hand mechanism 21.

Therefore, when the motor 1 is rotated, the gear 13 is rotated through the gears 4 and 10 and the main spring 17 is wound. By the unwinding torque of the spring, a time keeping mechanism (including a controlling mechanism 22 consisting of an escapement and a governor) is operated to rotate the hand mechanism 21 at a constant velocity. However, the main spring 17 is wound up in advance to correctly operate the escapement.

23 is a shaft to which is fixed a double-cam consisting of component cams 24 and 25. 26 is a lower contact spring. 27 is an upper contact spring. As shown in FIGURE 6(A), both contact springs 26 and 27 are in contact with the double-cam. 28 is a contact spring receiving plate. 29 is a lower contact attached to the lower contact spring 26. 30 is an upper contact attached to the upper contact spring 27. 31 is a bent leg of the upper contact spring 27. 32 is a forward end part of the upper contact spring 27. 33 is an electric battery.

Figure 3:
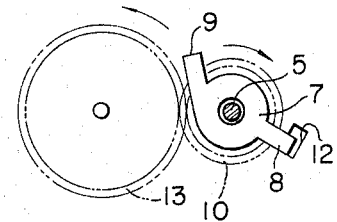
FIGURES 3 and 4 are partial plan views of the reversal preventing mechanism for explaining the reversal preventing operation of the mechanism.
Figure 4:
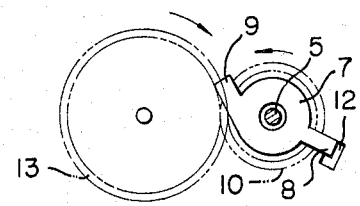

The operation of the illustrative device is as follows: First of all, referring to FIGURES 2 to 5, the mechanism for preventing reversal by the force of the main spring 17 shall be explained. When the motor 1 rotates, the gear 4, shaft 5 and gear 10 rotate. As the reversal preventing plate 7 is in frictional contact with the gear 10 due to the biasing action of the spring 6, if the gear 10 rotates in the normal direction indicated by the arrow in FIGURE 3, the reversal preventing plate 7 rotates with the gear 10. However, after the stopping member 8 comes into contact with the end of the stopping slot 12, said plate 7 slides on the gear 10. At this time, the locking member 9 is disengaged from the gear 13. In the state shown in FIGURE 3, when the motor 1 rotates, the gear 13 will rotate and wind up the main spring 17. In case the main spring 17 has been wound up, the electric source has been disconnected and the motor 1 has stopped, the gear 13 will be rotated in the reverse direction by the resiliency of the main spring 17. Then, as in FIGURE 4, the gear 10 will be also rotated in the direction indicated by the dotted line arrow. Consequently the reversal preventing plate 7 will also rotate together with the gear 10 until the locking member 9 engages with the tooth of the gear 13 to stop the rotation of the gear 13. Therefore, by said reversal preventing mechanism 3, the normal rotation from the motor 1 will be transmitted but the reverse rotation from the main spring will not be transmitted.

An alternative transmission mechanism using friction rollers in place of the aforedescribed gears in shown in FIGURE 5. However, as shown in FIGURE 5, even in the case of transmission by frictional engagement of rollers 10′ and 13′, the locking contacts the surface of the roller 13′ to stop the rotation.

Figure 8:
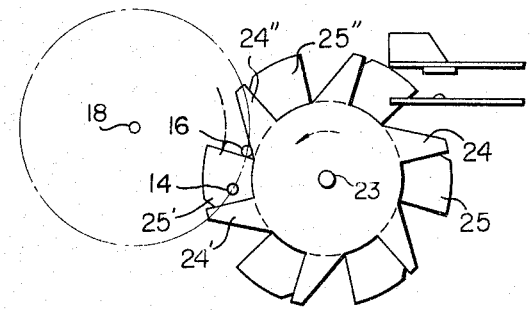

The operations of the double-cam, contact springs and driven levers shall now be explained. In FIGURE 7A, the contacts are open and the motor is stopped. The motor-driven lever 14 is stopped but the spring-driven lever 16 rotates continuously in the direction indicated by the arrow. In the state shown in FIGURE 8, the driven lever 16 has engaged the cam 25 to begin advancing movement thereof. The forward end part 32 of the upper contact spring 27 will slide on the surface of the cam 25.

Figure 9:
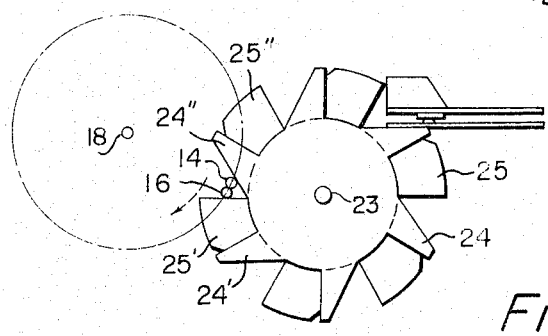

As shown in FIGURE 9, as the spring-driven lever 16 continues to advance the cam 25, the upper contact spring 27 drops from the cam 25 and the contacts 29 and 30 close for a moment, thereby actuating the motor 1 so that the motor-driven lever 14 rotates in the direction indicated by the arrow. Meanwhile, the spring-driven lever 16 rotates all the time, although the motor-driven lever 14 rotates much faster than the spring-driven lever 16. In this embodiment, the motor-driven lever is designed to make one revolution in 2 seconds, and the spring-driven lever 16 is designed to make one revolution in 10 minutes.

Figure 10:
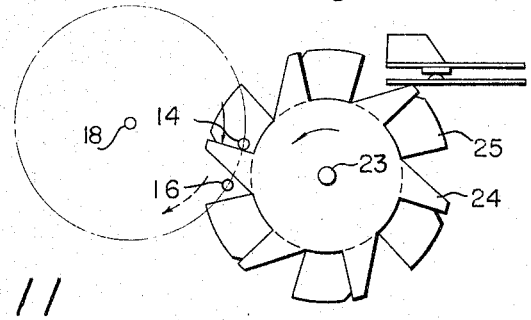

In FIGURE 10, the motor-driven lever 14 has nearly completed one revolution, has rotated the cam 24 and has thus pushed up the lower contact spring 26 into engagement with the upper contact spring 27. At this point, a force is required to lift the two springs. However, as they are lifted by the torque of the motor 1, the main spring 17 and the controlling mechanism 22 are not affected.

As the rotation of the lever 14 continues, the lower contact spring 26 drops from the cam 24 as in FIGURE 7B. The contact spring 27 remains supported on the surface of the cam 25 so that the contacts 29 and 30 open and stop the motor 1. In order that the cam may not freely move, the forward end part 32 of the contact spring 27 comes into a groove formed by the cams 24 and 25 (see FIG. 7A).

The above is one cycle of the operation. This operation is continually repeated so that, as soon as the main spring has unwound by one revolution, the motor will wind it up by one revolution as described above. Therefore, the controlling mechanism 22 of the clock is always driven by a substantially constant torque from the main spring and thus the accuracy of the clock is high.

Figure 11:
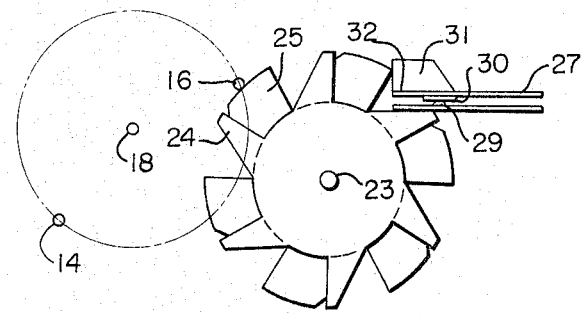

In case the voltage of the battery 33 has dropped so low that the motor 1 can no longer develop a torque sufficient to wind the main spring 17, the contacts will close as in FIGURE 9 and the motor 1 will begin to rotate. However, before one revolution has been completed, the motor-driven lever 14 will stop due to the insufficient torque as in FIGURE 11. The driven lever 16 will rotate all the time independently of the lever 14 but will stop in contact with the surface of the cam 25, and at the same time the time keeping mechanism will lose its driving force and will also stop.

Then, the cam 25 will be pushed in the reverse direction by the spring driven lever 16 but will be stopped by the bent part 31 of the contact spring 27. If there were no bent part 31, the cam would stop at the forward end part 32 but would move a little in the reverse direction. The tip of the cam 24 would thus overlap the track of the motor-driven lever 14 and the motor-driven lever 14 would eventually come into contact with the tip of the cam 24 and could not rotate the cam. Therefore, the bent part 31 is provided.

Figure 12:
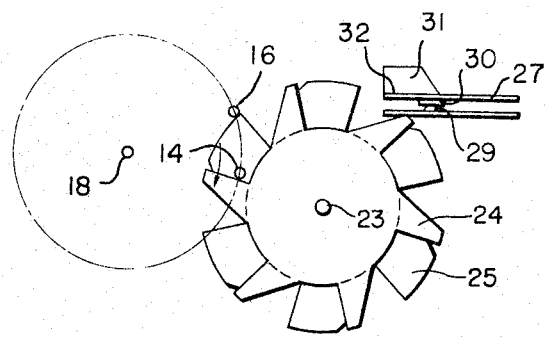
Figure 13:
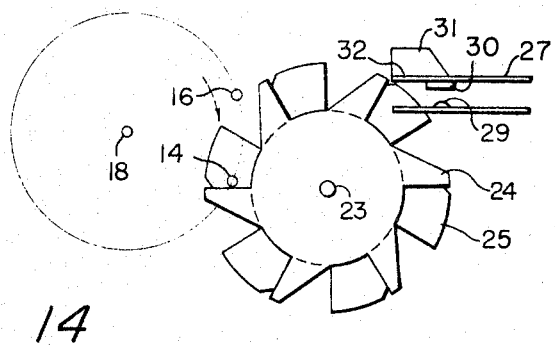

When the clock is found to have stopped and a new battery is put in, the motor 1 again begins to rotate to develop a torque sufficient to wind up the main spring. Thus, as shown in FIGURE 12, the cam 24 is rotated, the spring-driven lever 16 is disengaged from the surface of the cam 25 and the contact spring 26 is lifted at the same time. The contacts are then opened as shown in FIGURE 13 and the motor 1 stops. Then the spring driven lever 16 begins to rotate and the normal operation described above is resumed.

Thus the clock always operates within the range of one revolution of the main spring without fail.

The driven levers 14 and 16 are made somewhat loose in the rotating direction with respect to the gears 13 and 15, respectively, because, in case one lever pushes the tooth of the cam to rotate the cam, the other lever is pushed from behind by the tooth next to the tooth which was pushed by the first lever. Thus, as shown in FIG. 9, when spring-driven lever 16 pushes the tooth 25′, motor-driven lever 14 is pushed from behind by the tooth 24″ next to the tooth 24′ which was pushed by the lever 14. Similarly, when motor-driven lever 14 pushes the tooth 24″ spring-driven lever 16 is pushed from behind by the tooth 25″ in FIG. 7. If the gear and lever were fixed together, they would be locked there and the cam would stop but, if they are made loose with respect to each other, only the lever is pushed forward to precede the gear and the cam does not stop. As soon as the gear is driven again, it overtakes the lever and operates normally.

According to the present invention, the contacts which actuate and deactuate the rewinding motor are opened and closed quickly by the double-cam so as to be protected and at the same time the cam is operated by the two driven levers, one being a lever rotated by the motor and the other being a lever rotated by the main spring. Therefore, the contacts open and close quickly and positively and are stable over a long time without failure.

Also, according to the present invention, the two driven levers are made freely rotatable in the rotating direction by some angles with respect to the respective fixed gears. Therefore, the positive operation of the levers on the cam is increased.

Further according to the present invention, in case, due to voltage drop or the like, the torque of the motor has dropped too low to wind up the main spring, the lever will stop in contact with the cam before the spring unwinds completely. Consequently, when the motor winds the main spring after the battery is replaced, the normal operating state will be restored. Thus, the clock operates with a constant torque, and its accuracy is high.

If the main spring unwinds on and on, it will come to a place where the torque is weak. When the spring is wound again, the automatic winding will be repeated in the place where the torque is weak.

Further, according to the present invention, when the cam does not rotate, a recess will be formed on the surface of the cam. Then the forward end of the contact spring will drop into the recess so that the cam may not freely rotate.

Still according to the present invention, a projection is provided on the upper contact spring so that when the upper contact spring drops from the tooth of the cam, the cam will not reverse.

Also according to the present invention, in case the two driven levers rotate the respective cams, when the weaker main spring driven lever pushes the cam, the forward end part of the upper contact spring will run on the flat surface of the cam. Therefore, the required torque will be so small that the influence on the escapement will be small. When both upper and lower contact springs ascend the steep slope of the cam or the torque is large, the cams will be pushed by the motor. Therefore, the operation is positive.

As the motor winds only the main spring and the time keeping mechanism is operated only by the main spring, the time keeping mechanism will not be directly influenced by the motor. Therefore, the accuracy of the clock is not varied by the reduction of the battery voltage and the deterioration of the motor.

What is claimed is:

1. A drive system for an electric clock comprising the combination of an electric motor and switch means for turning the motor on and off, a source of D.C. electrical power for said motor, time indicating mechanism, a main spring operatively connected to said time indicating mechanism for driving the same, input means operatively connected to said main spring and said motor for periodically winding the spring, output means operatively connected to said main spring for movement responsive to the unwinding of said spring, a double cam having a first set of cam surfaces cooperating with said output means and a first one of said contact springs for camming said first contact spring away from the other contact spring during a major portion of each revolution of the output means and then releasing the first contact spring at the end of each revolution, and a second set of cam surfaces cooperating with said input means and the second contact spring for camming the second spring toward the first spring upon release of said first spring, maintaining the second spring in such position during a major portion of each revolution of the input means, and then releasing the second spring at the end of each revolution.

2. A drive system for an electric clock, which drive system comprises the combination of an electric motor and a source of D.C. power for said motor, a time indicating mechanism, a main spring operatively connected to said time indicating mechanism for driving the same, a pair of contact springs connected to said motor and the power source for actuating and deactuating the motor, a double cam mounted for rotation about an axis offset from the axis of said main spring, said cam having a first set of cam surfaces engaging one of said contact springs and a second set of cam surfaces engaging the other contact spring, output means operatively connected to one end of said main spring for driving the time indicating mechanism in response to the unwinding movement of the spring, said output means including a first control means adapted to engage said first set of cam surfaces during only a small portion of each unwinding revolution of the spring for actuating said motor, whereby the cam is disengaged from said output means during the balance of each unwinding revolution, and input means operatively connected to the other end of said main spring for winding the spring in response to actuation of said motor, said input means including a second control means adapted to engage said second set of cam surfaces during only a small portion of each winding revolution of the spring for deactuating said motor.

3. A drive system according to claim 2 wherein each of said first and second cam engaging control means is at least partially freely rotatable with respect to said output means and input means, respectively.

4. A drive system according to claim 2 wherein said input means includes a gear driving the same, said gear including a reversal-preventing plate in frictional contact with said input means and loosely fitted on the shaft of said gear, said reversal-preventing plate providing at one end thereof stop means and at the other end thereof lock means, ground means including a stopping slot engageable with said stop means so that when said gear rotates in one direction, said reversal preventing-plate rotates together with the gear until said stop means engages said slot in said ground means and so that when said gear rotates in the opposite direction said reversal-preventing plate rotates in the reverse direction until said lock means engages said input means thereby stopping the rotation.

References Cited by the Examiner

UNITED STATES PATENTS

| | | | |
|---|---|---|---|
| 2,073,782 | 3/1937 | Cole et al. | 200—30 |
| 2,722,297 | 11/1955 | Gates | 192—4 |
| 2,909,029 | 10/1959 | Witte | 58—41 |
| 3,113,639 | 12/1963 | Koplar et al. | 185—40 |

RICHARD B. WILKINSON, *Primary Examiner.*

LEO SMILOW, *Examiner.*

GERALD F. BAKER, *Assistant Examiner.*